United States Patent
Sowards et al.

(10) Patent No.: US 9,873,431 B2
(45) Date of Patent: Jan. 23, 2018

(54) VEHICLE TRANSMISSION BRAKE LAUNCH SYSTEM AND METHOD

(71) Applicants: Michael D Sowards, Clarkston, MI (US); James M Wilder, Farmington Hills, MI (US); Joseph M Johnson, Grand Blanc, MI (US)

(72) Inventors: Michael D Sowards, Clarkston, MI (US); James M Wilder, Farmington Hills, MI (US); Joseph M Johnson, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/409,909

(22) Filed: Jan. 19, 2017

(65) Prior Publication Data

US 2017/0203760 A1    Jul. 20, 2017

Related U.S. Application Data

(60) Provisional application No. 62/280,733, filed on Jan. 20, 2016.

(51) Int. Cl.
| | |
|---|---|
| *B60W 30/18* | (2012.01) |
| *F16H 3/66* | (2006.01) |
| *B60W 10/06* | (2006.01) |
| *B60W 10/115* | (2012.01) |
| *B60W 10/184* | (2012.01) |
| *B60W 50/14* | (2012.01) |
| *F16H 61/00* | (2006.01) |

(52) U.S. Cl.
CPC ...... *B60W 30/18027* (2013.01); *B60W 10/06* (2013.01); *B60W 10/115* (2013.01); *B60W 10/184* (2013.01); *B60W 50/14* (2013.01); *F16H 3/66* (2013.01); *F16H 61/0059* (2013.01); *B60W 2050/146* (2013.01); *B60W 2710/0666* (2013.01); *B60W 2710/1005* (2013.01); *F16H 2200/006* (2013.01); *F16H 2200/2012* (2013.01); *F16H 2200/2046* (2013.01)

(58) Field of Classification Search
CPC ..................... B60W 30/18027; B60W 10/115
See application file for complete search history.

(56) References Cited

U.S. PATENT DOCUMENTS

| | | | |
|---|---|---|---|
| 8,924,061 B2 | 12/2014 | Reed et al. | |
| 9,248,829 B2 | 2/2016 | Reed et al. | |
| 2015/0266479 A1 | 9/2015 | Blakeway et al. | |

*Primary Examiner* — Derek D Knight
(74) *Attorney, Agent, or Firm* — Ralph E Smith

(57) ABSTRACT

A transmission launch system includes a control system and a transmission having a plurality of clutches, where actuation of combinations of a predetermined number of clutches provides powerflow for different transmission drive gears. The control system is configured to initiate a performance launch of the vehicle where the transmission is commanded to engage a combination of the predetermined number of clutches corresponding to a forward drive gear. The transmission is then commanded to engage an additional clutch to lock its output shaft such that engine torque is prevented from being transferred to vehicle drive wheels. The engine generates drive torque greater than a capacity of a vehicle brake system and the control system then commands release of the additional clutch thereby unlocking the output shaft and allowing powerflow in the forward drive gear such that the generated engine drive torque is transferred to the drive wheels to propel the vehicle.

14 Claims, 6 Drawing Sheets

| Gear | Ratio | Clutch | | | | |
|---|---|---|---|---|---|---|
| | | A | B | C | D | E |
| 1 | 4.71 | X | X | X | | |
| 2 | 3.14 | X | X | | X | |
| 3 | 2.10 | | X | X | | X |
| 4 | 1.67 | | X | | X | |
| 5 | 1.29 | | X | X | X | |
| 6 | 1.00 | | | X | X | X |
| 7 | 0.84 | X | | X | X | |
| 8 | 0.67 | | | | | |
| R | 3.32 | X | X | | X | |

| Clutch/Brake | | | | | |
|---|---|---|---|---|---|
| Gear | A | B | C | D | E |
| 1st | ON | ON | ON | | |
| 2nd | ON | ON | | | ON |
| 3rd | | ON | ON | | ON |
| 4th | | ON | | ON | ON |
| 5th | | ON | ON | ON | |
| 6th | | | ON | ON | ON |
| 7th | ON | | ON | ON | |
| 8th | ON | | | ON | ON |
| Rev | ON | ON | | ON | |
| Park/Neutral | ON | ON | | | |
| Spread | | | | | |

| Gear | Ratio | Clutch | | | | |
|---|---|---|---|---|---|---|
| | | A | B | C | D | E |
| 1 | 4.71 | X | X | X | | |
| 2 | 3.14 | X | X | | | X |
| 3 | 2.10 | | X | X | | X |
| 4 | 1.67 | | X | | X | |
| 5 | 1.29 | | X | X | X | |
| 6 | 1.00 | | | X | X | X |
| 7 | 0.84 | X | | X | X | |
| 8 | 0.67 | | | | | |
| R | 3.32 | X | X | | X | |

| Gear | Ratio | Clutch | | | | |
|---|---|---|---|---|---|---|
| | | A | B | C | D | E |
| 1 | 4.71 | X | X | X | | |
| 2 | 3.14 | X | X | | | X |
| 3 | 2.10 | | X | X | | X |
| 4 | 1.67 | | X | | X | |
| 5 | 1.29 | | X | X | X | |
| 6 | 1.00 | | | X | X | X |
| 7 | 0.84 | X | | X | X | |
| 8 | 0.67 | | | | | |
| R | 3.32 | X | X | | X | |

VEHICLE TRANSMISSION BRAKE LAUNCH SYSTEM AND METHOD

CROSS-REFERENCE TO RELATED APPLICATIONS

This application claims benefit of U.S. Provisional Application Ser. No. 62/280,733 filed on Jan. 20, 2016. The disclosure of the above application is incorporated herein by reference in its entirety.

FIELD

The present application relates generally to vehicle transmissions and, more particularly, to an automatic transmission brake and method of using the same for improved vehicle staging and launch control and performance.

BACKGROUND

In some vehicle launch scenarios, to increase performance of the vehicle at take-off, drivers sometimes perform a manual manipulation of the brakes and throttle to increase engine power and/or driveline torque immediately available to launch the vehicle. For example, the driver of the vehicle may apply the conventional vehicle foundation brakes while simultaneously increasing the throttle position to increase available engine and/or power to launch the vehicle. Such a methodology, however, requires the driver to simultaneously perform multiple tasks which may be difficult to safely or correctly perform, and is limited by the foundation brake system's ability to hold the vehicle stationary. Accordingly, it is desirable to provide an original equipment manufacturer integrated vehicle launch system with improved vehicle torque holding capability and performance.

SUMMARY

In accordance with one example aspect of the invention, a vehicle transmission brake launch system is provided. In one exemplary implementation, the transmission brake launch system includes a transmission and a control system. The transmission includes a plurality of clutches and an output shaft, where actuation of different combinations of a predetermined number of clutches of the plurality of clutches provides powerflow for corresponding different transmission forward drive gears. The control system is configured to receive a command to initiate a performance launch of the vehicle; and command the transmission to engage a combination of the predetermined number of clutches corresponding to a predetermined forward gear. The transmission is commanded to engage an additional clutch of the plurality of clutches, thereby resulting in the transmission being in a state where the output shaft is bound and torque from the engine is prevented, by the transmission, from being transferred to drive wheels of the vehicle. The engine is commanded to generate drive torque, which is greater than a predetermined torque capacity of a foundation brake system of the vehicle; and, upon receipt of a command to launch the vehicle, the control system commands release of the additional clutch thereby unbinding the output shaft of the transmission and allowing powerflow in the predetermined forward gear such that the generated drive torque is transferred to the drive wheels to propel the vehicle.

In one exemplary implementation, the control system is further configured to: confirm the foundation brakes are applied and vehicle brake torque is above a predetermined brake threshold; after commanding the transmission to engage the combination of the predetermined number of clutches corresponding to the predetermined forward gear and before commanding the transmission to engage the additional clutch, command the engine to generate a predetermined amount of torque that is less than the generated drive torque and less than the torque capacity of the foundation brake system; and transfer the predetermined amount of torque to the drive wheels through a driveline of the vehicle with the vehicle foundation brake system preventing movement of the drive wheels to thereby capture the predetermined amount of torque in the driveline to i) remove lash from the driveline, ii) preload bushings and shafts of the driveline, and iii) torque an axle of the driveline against associated travel limiters.

In one exemplary implementation, the control system is further configured to: cause a message to be displayed via a user interface associated with an interior of the vehicle, the message instructing a brake pedal of the vehicle to be released; and maintain brake torque above the predetermined brake threshold independent of application of the brake pedal so as to keep driveline torque captured until the transmission is commanded to release the addition clutch.

In one exemplary implementation, the plurality of clutches includes only five clutches, the transmission being free of any additional clutches utilized to make forward drive gears of the transmission. In one exemplary implementation, the combination of the predetermined number of clutches corresponding to the predetermined forward gear and the additional clutch are utilized in providing powerflow for first and second gears of the transmission.

In one exemplary implementation, the combination of the predetermined number of clutches corresponding to the predetermined forward gear is utilized in providing powerflow for first gear of the transmission, and the additional clutch is utilized in providing powerflow for second gear and not for first gear. In one exemplary implementation, the combination of the predetermined number of clutches corresponding to the predetermined forward gear is utilized in providing powerflow for second gear of the transmission, and the additional clutch is utilized in providing powerflow for first gear and not for second gear.

In one exemplary implementation, the combination of the predetermined number of clutches corresponding to the predetermined forward gear includes two brake clutches and one rotating clutch; and the additional clutch is a rotating clutch that, when utilized in the different combinations of the predetermined number of clutches of the plurality of clutches to provide powerflow for different forward drive speeds of the transmission, provides powerflow for second through fourth and sixth gears of the transmission. In one exemplary implementation, the additional clutch is a rotating clutch that, when utilized in the different combinations of the predetermined number of clutches of the plurality of clutches to provide powerflow for different forward drive speeds of the transmission, provides powerflow for first, third and fifth through seventh gears of the transmission.

In one exemplary implementation, the control system is further configured to determine a tractive effort threshold where greater torque applied to the wheels would result in wheel slip and, based on this determined tractive effort threshold, command the predetermined forward gear to be first gear or second gear.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

In accordance with an example aspect of the invention and as will be discussed in greater detail herein, a transmission brake or transbrake system and associated methodology is provided and facilitates use of powertrain capability to hold a vehicle stationary and subsequently launch the vehicle with increased vehicle acceleration over a conventional vehicle launch. In one exemplary implementation, the transbrake provides for a strategic tie-up or locking of the vehicle automatic transmission to hold the vehicle stationary under a greater drive torque than can be withheld by a typical vehicle foundation brake system.

During such an exemplary transmission tie-up, the engine throttle position may be increased, such as by the driver or ECU, while the vehicle (e.g., wheels, driveline, transmission) remain fixed/stationary because the transmission transbrake feature reacts all of the engine generated torque. When the transbrake is released, the vehicle will launch from a standstill at a high engine speed (RPM) and torque with maximum or substantially maximum torque converter multiplication. The increased engine torque and powertrain inertia generated by the transbrake are used to accelerate the vehicle at a greater rate than if transbrake was not utilized. In one exemplary implementation and as will also be discussed in greater detail below, the transbrake has three phases: Ready, Engaged and Release. The transbrake system and methodology may also be incorporated with a driveline protection strategy where driveline lash is removed or substantially removed prior to vehicle launch for protection and increased durability of the associated vehicle driveline components.

Figure 2:
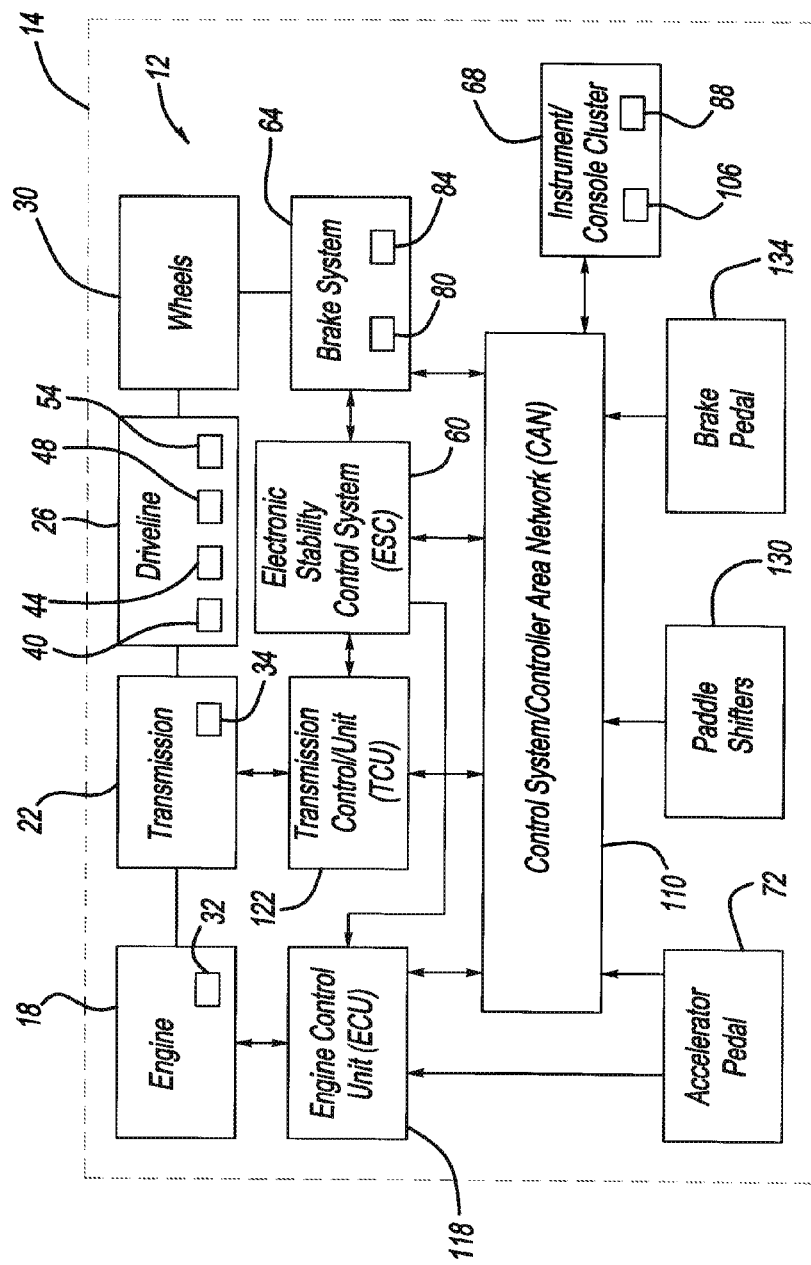
FIG. 2 is a schematic block diagram of an example vehicle system in accordance with the principles of the present application.

In accordance with various aspects of the present disclosure, the transbrake system and methodology are implemented utilizing a vehicle system 10 of an exemplary vehicle 14 schematically illustrated in FIG. 2. The vehicle system 10 includes, in one exemplary implementation, an engine 18, a transmission 22 coupled thereto, an associated driveline 26 and wheels 30. The engine 18 and transmission 22 each include various respective sensors 32 and 34, for sensing directly or indirectly parameters such as speed, pressure, temperature, position of clutch members or elements, etc., as is known in the art. Such sensors are in communication with and configured to provide signals to and receive signals or commands from each other and a vehicle control system (discussed below).

The driveline 26 includes, in the exemplary implementation illustrated, a prop shaft 40 having associated bushings and joints 44, axle(s) and/or halfshafts 48, such as for front wheels and rear wheels, and snubber plates and/or other travel limiters 54, as is known in the art. The vehicle system 10 also includes an electronic stability control system (ESC) 60, a foundation brake system 64, an instrument panel and/or console 68, an accelerator pedal 72 and a brake pedal 134. The foundation brake system includes an anti-lock braking system (ABS) 80 and one or more wheel speed sensors 84, as is known in the art. The accelerator pedal 72 is for providing a driver input, e.g., a torque request, for engine 18, as is also known in the art.

Figure 3:
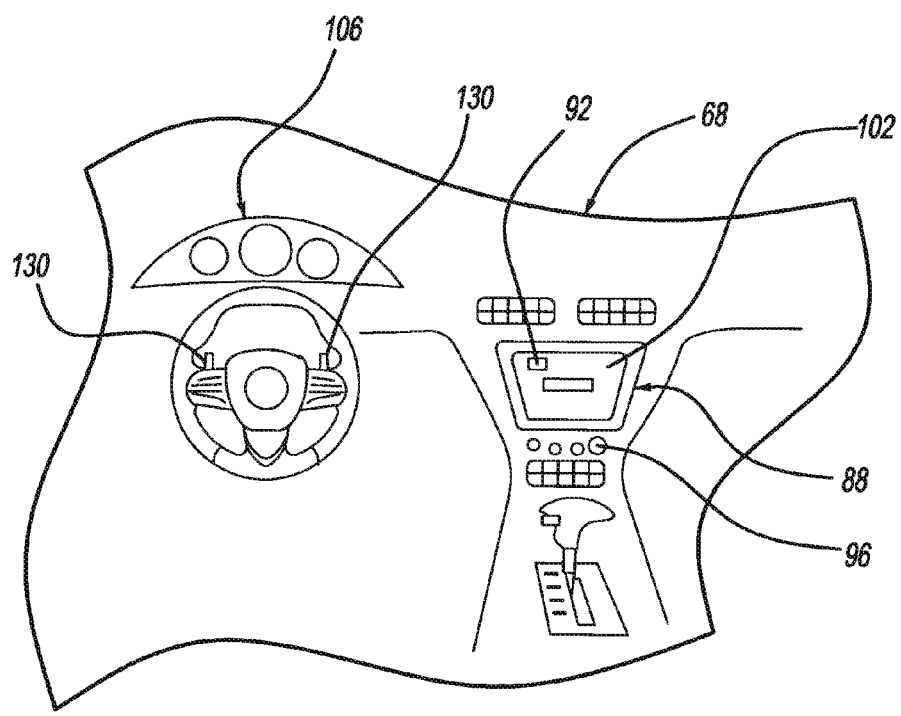
FIG. 3 is a partial schematic illustration of an exemplary vehicle instrument panel and console of the vehicle system of FIG. 1 in accordance with the principles of the present application.

In the exemplary implementation illustrated in FIGS. 2 and 3, the instrument panel 68 includes a driver/occupant/user interface 88 that includes various soft 92 and/or hard buttons 96 for providing input to the vehicle control system, as will be discussed below in greater detail. The driver interface 88 thus includes an interactive display screen 102 and/or cluster screen display 106 for providing/displaying information to the driver/occupants as well as for facilitating input (such as via the soft keys 92) to the vehicle control system, as is also known in the art.

One or more controllers are utilized to control the various vehicle components or systems discussed above. In one exemplary implementation, various individual controllers are utilized to control the various components/systems discussed herein and are in communication with each other and/or the various components/systems via a main controller and/or local interface 110. In this exemplary implementation, the local interface 110 is one or more buses or other wired or wireless connections, as is known in the art. In the example illustrated in FIG. 2, the local interface 110 is a controller area network (CAN). The CAN 110 may include additional elements or features, which have been omitted for simplicity, such as controllers, buffers (cache) drivers, repeaters and receivers, among many others, to enable communications. Further, the CAN 110 may include address, control and/or data connections to enable appropriate communications among the components/systems described herein and may also be referred to herein as the control system.

In the example illustrated in FIG. 2, the vehicle system 10 includes an engine control unit (ECU) 118 for controlling engine 18 and a transmission control unit (TCU) 122 for controlling transmission 22. Each of the control units (118, 122) as well as the ABS 80, accelerator pedal 72, instrument/console cluster 68, paddle shifters 130 and brake pedal 134 are in communication with CAN 110 and thus each other. It will be appreciated that while individual control units are discussed herein and shown in various Figures, the individual control units may also be optionally implemented in the form of one control unit, such as a powertrain or vehicle control unit or system. Thus, it will be appreciated that while the discussion will generally continue with reference to the individual controllers discussed above, the discussion is equally applicable to the components of vehicle system 10 being controlled by one controller or vehicle control system.

Referring briefly again to the conventional method for attempting to improve vehicle launch timing/acceleration discussed above, the vehicle driver applies the conventional vehicle foundation brakes 64 while simultaneously increasing the throttle position to increase available engine power to launch the vehicle. Such a methodology, however, is limited by the foundation brake system's 64 ability to hold the vehicle 14 stationary, which is significantly less than the transmission utilized with the transbrake system and method of the present application.

Figure 1:
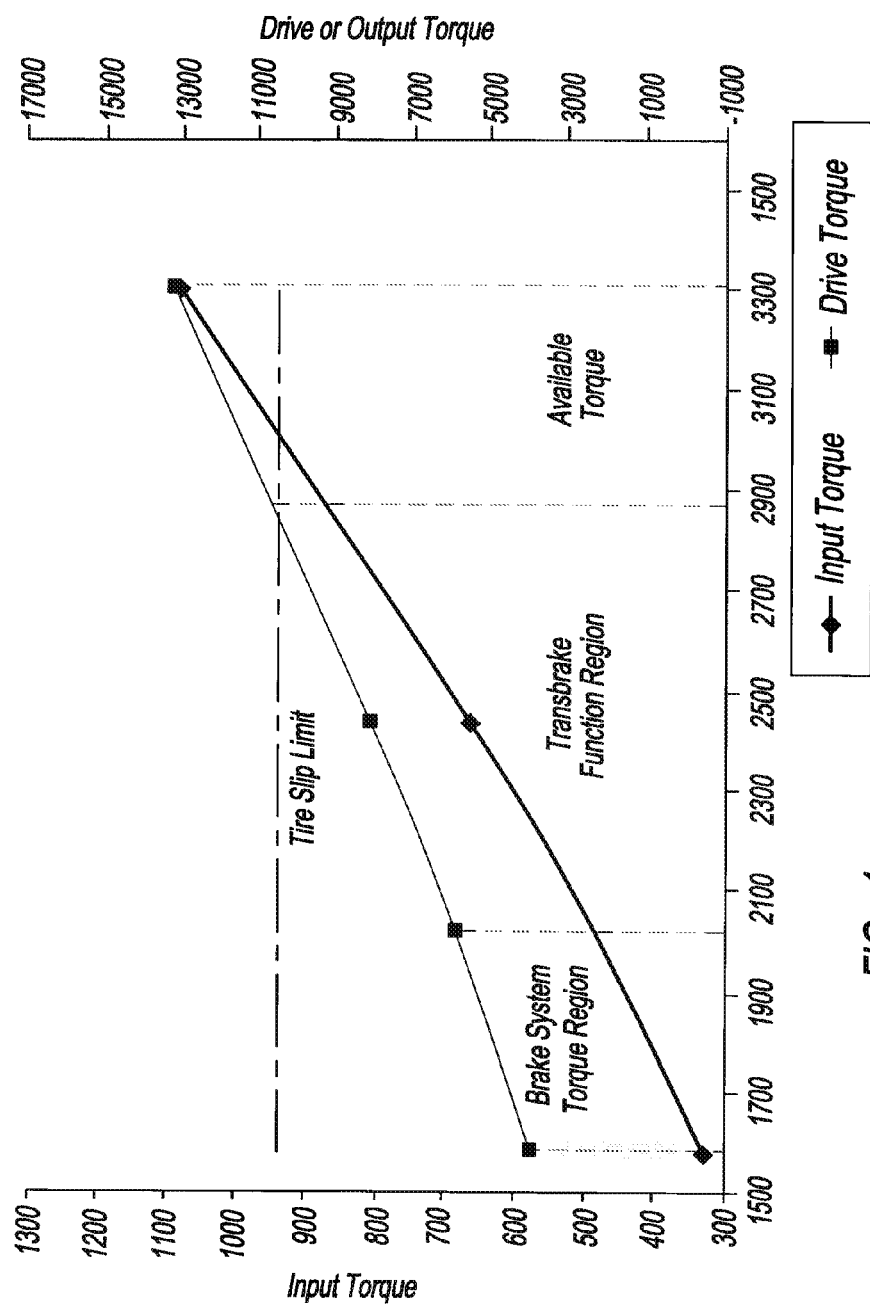
FIG. 1 is graphical illustration of example vehicle launch control parameters for a vehicle foundation brake system and an exemplary transmission brake or "transbrake" arrangement in accordance with the principles of the present application.

For example and with reference to FIG. 1, the foundation brakes 64 for the vehicle of this example, are capable of holding the vehicle stationary up to only approximately 6,000 Nm of torque, whereas the transmission with use of the transbrake feature is configured to hold the vehicle stationary up to approximately 11,000 Nm of torque. Thus, the transbrake feature capitalizes on otherwise unused powertrain braking/locking capabilities to maintain the vehicle stationary while increasing engine 18 torque and/or speed to provide for improved and controlled vehicle 14 launch acceleration. In one exemplary implementation, the transbrake torque threshold triggering release of the transbrake is correlated to a vehicle wheel slip threshold, which is based at least on the vehicle weight and specific parameters of the vehicle tires (as well as road/track conditions). In one exemplary implementation, the wheel slip threshold is approximately 11,000 Nm and may be determined by the control system with or without input from the driver.

As also briefly mentioned above, the transbrake feature involves a strategic automatic transmission tie-up or temporary locking to hold the vehicle stationary while the engine throttle position is increased. This provides an advantage of increased tractive effort to accelerate the vehicle upon release of the transbrake based on utilization of then stored powertrain energy.

Below is a discussion of the transbrake feature in connection with use of clutches of transmission 22 to selectively lock transmission 22; followed by a discussion of exemplary control strategies and/or methodologies for implementing the transbrake feature in associated vehicle 14.

In one exemplary implementation and as will be discussed below by way of example with reference to an eight speed automatic transmission 22, the transbrake feature is implemented while taking advantage of five existing controllable clutches (A-E) within the transmission 22. In one exemplary implementation, the clutches (A-E) are electro-hydraulically controlled clutches, although one skilled in the art will appreciate that other controllable clutch or torque transfer device arrangements may be utilized in connection with the example eight speed transmission 22 or a transmission having more or less speeds. In one exemplary implementation, the transmission 22 includes only these five clutches (i.e., no additional clutches) for use in making forward drive gears.

Figures 4A, 4B:
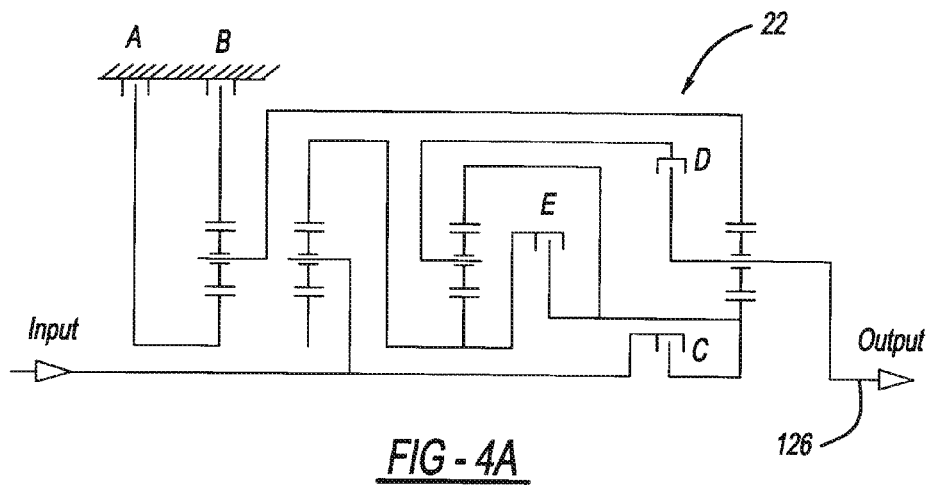
FIG. 4A is a partial schematic illustration of an exemplary transmission of the vehicle system of FIG. 1 in accordance with the principles of the present application.
FIG. 4B is a table illustrating exemplary clutch application and shift sequences for the transmission of the vehicle system of FIG. 1 in accordance with the principles of the present application.

In this exemplary implementation, four clutches are utilized and/or controlled to temporarily tie-up or lock the transmission 22 such that an output or output shaft 126 of the same remains stationary. In this exemplary implementation and as can be initially seen in FIGS. 4A-4B, a predetermined number of clutches, such as three clutches, are required to be activated/applied to make a gear, and a unique, selective application of a certain fourth clutch will selectively tie-up or lock the transmission 22 with the transbrake application, until the fourth clutch is released or deactivated, as explained in greater detail below. FIG. 4A illustrates a schematic layout of the exemplary eight-speed transmission 22, which includes two stationary clutches or brakes A and B, and three rotating clutches C, D and E. FIG. 4B illustrates application of certain of the five clutches, as commanded by the TCU 122, to make forward gears 1-8, reverse gear and park.

Figures 5A, 5B:
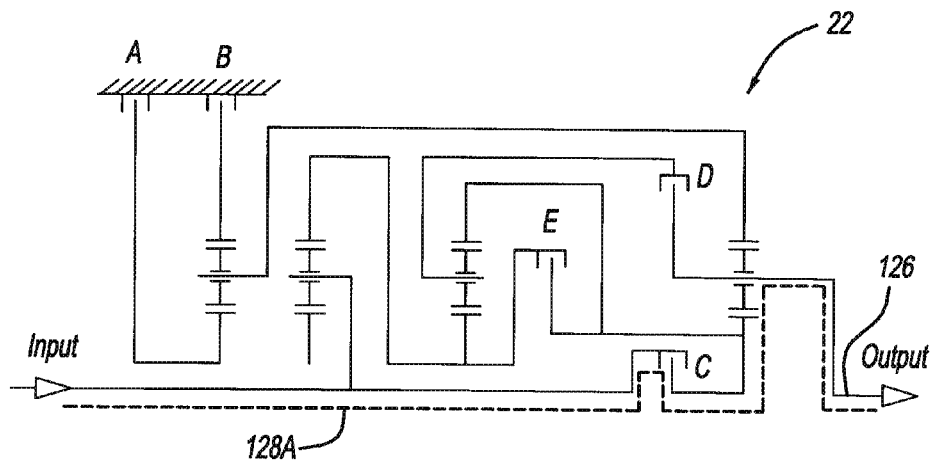
FIG. 5A is a schematic illustration of an exemplary transbrake application showing powerflow in connection with an exemplary transmission first gear vehicle launch in accordance with the principles of the present application.
FIG. 5B is a table illustrating exemplary clutch application and/or venting for the exemplary transbrake of FIG. 5A in accordance with the principles of the present application.

In one exemplary implementation and with particular reference to FIGS. 5A-5B, one example application of transbrake will now be discussed in greater detail. In this exemplary application, clutches A, B and C are applied along with clutch E by command of the TCU 122 for the transbrake tie-up of the transmission 22. With this application of four clutches, the transmission 22 is locked with no powerflow and the vehicle will remain stationary as the engine throttle position is increased by the driver and/or ECU in the manner discussed above. With application of clutches A, B and C, first gear is made, with powerflow shown by the dashed line 128A in FIG. 4A. As a result, when transbrake is applied with clutches A, B, C and E (see FIGS. 5A and 5B), additional clutch E is controlled to release or vent at a certain time, such as by TCU 122 in signal communication therewith, which will then result in the transmission 22 no longer being locked or tied-up and the configuration for first gear powerflow being in place. Therefore, upon release of clutch E, the vehicle 14 will launch in first gear.

Figures 6A, 6B:
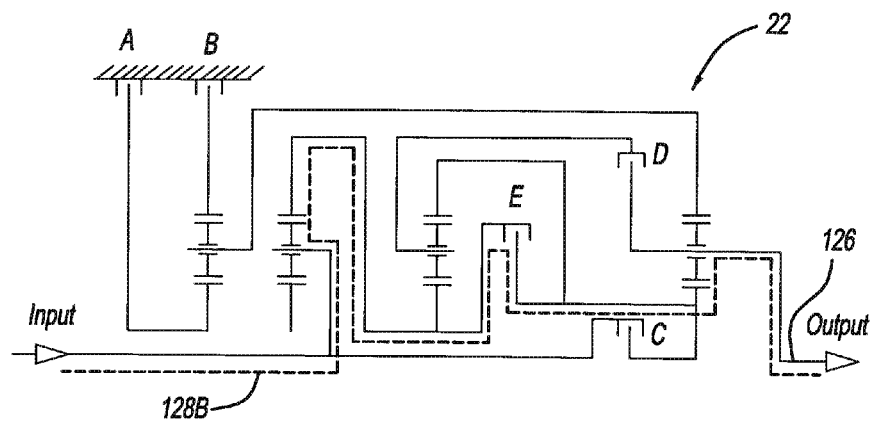
FIG. 6A is a schematic illustration of an exemplary transbrake application showing powerflow in connection with an exemplary transmission second gear vehicle launch in accordance with the principles of the present application.
FIG. 6B is a table illustrating exemplary clutch application and/or venting for the exemplary transbrake of FIG. 6A in accordance with the principles of the present application.

In another exemplary implementation and with reference to FIGS. 6A-6B, clutches A, B and E are applied to make second gear in the transmission 22, as shown by the powerflow dashed line 128B in FIG. 6A, and transbrake is applied or activated by TCU 122 applying or causing additional clutch C to be applied, as shown for example in FIG. 6B. As discussed above, application of four clutches in this manner creates the transbrake transmission tie-up, binding the output. Upon release or venting of clutch C, the vehicle 14 will launch in second gear (see powerflow 128B in FIG. 6A), as the transmission 22 will no longer be locked and will be in the configuration for powerflow in second gear (i.e., application of clutches A, B and E).

Select application and venting of the exemplary combination of clutches ABCE discussed above provides for the ability to selectively launch the vehicle 14 in either first or second gear, which can be determined automatically by the vehicle control system or in part or in full by the driver. Further, should the transbrake not hold the vehicle stationary, the vehicle will launch in a forward direction in either first or second gear.

In another exemplary implementation, clutches A, B, C and D may be utilized for transbrake, as discussed below. In one implementation, clutches A, B and C along with clutch D are simultaneously applied for transbrake to tie-up the transmission, and then additional clutch D is vented or de-energized thereby leaving clutches A, B and C applied for powerflow in first gear. As can be seen with reference to FIGS. 4A-4B, clutches A, B and D applied represent powerflow in Reverse.

In another example implementation, clutches A, B, D and E may be simultaneously applied or caused to be applied by the control system 110 for the transbrake feature to tie up the transmission. Additional clutch D may then be vented or de-energized such that clutches A, B and E remain applied, which, as discussed above, is the configuration for powerflow in second gear. As a result, using transbrake in this manner will yield a second gear vehicle launch.

As briefly mentioned above, the transbrake control and application strategy may be summarized as including three phases: Ready, Engage and Release. Each of these phases will be discussed below in connection with overall operation and use of the transbrake system to launch an associated vehicle, such as exemplary vehicle 14.

In one exemplary implementation, in order to activate transbrake, a vehicle user, such as the driver, activates a track or drag racing or equivalent vehicle mode, such as by selecting a representative icon or button (e.g., soft button 92) using the driver/user interface 88. Upon accessing the drag or similar vehicle mode or page via the soft buttons 92 of the driver interface 88, for example, the driver indicates the intent to activate transbrake by simultaneously applying and holding for a predetermined period of time, steering wheel mounted left and right paddles 130 (FIG. 3). In one exemplary implementation, the vehicle system 10 then evaluates various vehicle and powertrain conditions/parameters before allowing entry to the transbrake Ready Phase.

In one exemplary implementation, the entrance criteria for the Ready phase includes: the vehicle 14 being in drag or an equivalent mode as discussed above; application of the left and right paddle shifters 130 as also discussed above; vehicle brake pressure/torque being above a predetermined threshold; engine speed being above a predetermined threshold; front wheels 30 being orientated in a forward direction and/or within a predetermined tolerance of the same; transmission 22 temperature between a minimum and maximum threshold; vehicle speed being zero; and the transmission 22 being placed in a predetermined gear.

If the entrance criteria are met, the Ready phase is entered. In one exemplary implementation, a communication indicative of the same is presented to the driver, such as via the infotainment unit user interface 88 or interface 106. In the Ready phase, a predetermined minimal amount of forward drive torque is sent through the vehicle driveline 26 and captured by the vehicle foundation brake system 64 (which is applied by the driver as indicated by the minimum brake pressure/torque threshold criteria discussed above). This provides for preloading the driveline 26 with forward drive torque to remove all lash from the driveline. In one exemplary implementation, driveline bushings 44 and shaft(s) 40 are preloaded and an associated axle/halfshafts 48 is/are wound up against snubber plates or other anti-rotation features and/or travel limiters 54. In this exemplary implementation, a predetermined amount of torque is commanded to be provided by the engine 18 and transferred to the drive wheels 30 via the transmission 22 and driveline 26, where this predetermined amount of torque is less than the torque that will subsequently be generated by the engine 18 for launching the vehicle 14 with transbrake, and is less than a torque capacity of the foundation brake system 64.

Next is the Engaged phase. To enter this phase, and upon completion of the above in connection with the Ready phase, the vehicle operator will release one of the shifter paddles or other hard or soft buttons serving 130 for this function. The vehicle controller or control system 110 will verify or continue to verify that the criteria discussed above in connection with entering the Ready phase is still met or true with the exception of both paddle shifters 130 being applied. If such conditions are still met and the operator has released one of the paddle shifters 130 while maintaining application of the other paddle shifter 130, the transbrake feature will be applied.

During the Engaged phase or phase 2, an electronic stability control (ESC) or similar system 60 of the vehicle 14 holds or maintains the previously applied or applied brake pressure to keep or maintain the captured driveline torque or preload. The driver can now release the brake pedal 134 as the ESC system 60 will maintain the brake pressure and hold the vehicle 14 stationary. The transmission controller 122 will then apply transbrake by applying a fourth clutch element (additional clutch) to tie-up or lock the transmission (noting that the transmission 22 is already in a gear, such as first gear, as discussed above). For example, the transmission controller 122 will ultimately apply four clutches (e.g., A, B, C and E) for first or second gear launch as discussed above.

At this point, the control system 110 will cause a message to be displayed in the instrument panel 68, such is in the user display screen 102 of the infotainment unit 88 or 106, indicating that transbrake is engaged or activated or the like. In one exemplary implementation, the messaging is communicated over the vehicle CAN BUS and/or a local private network. While in the Engaged phase, the driver or ECU can increase the throttle position to increase engine torque to launch the vehicle 14. As discussed above, this engine 18 torque is reacted by the transbrake transmission 22 feature thereby allowing downstream powertrain components and the vehicle 14 to remain stationary until transbrake is released. In one exemplary implementation, the engine 18 torque is reacted solely by the transbrake transmission tie-up and is much greater than the torque capacity of the foundation brake system 64.

In one exemplary implementation, the vehicle control system, such as the transmission controller, can limit the engine RPM to a predetermined threshold while in the Engaged phase. This threshold can be based on, for example, one or more of the following: torque threshold capability of locked transmission; tire slip threshold; predicted tractive effort threshold depending on road/track surface and tire parameters.

With regard to the second and third thresholds, the vehicle control system would include information on the weight of the vehicle and request, if not available, input on the wheel speed vs. ground speed and/or tire parameters and road or track surface conditions (e.g., temperature, moisture amount, etc.). With this information, the vehicle control system will utilize an on-board algorithm or, via an internet connection associated with the infotainment unit or the like, communicate with an external system to determine a tractive effort threshold.

This determined tractive effort threshold can, in one exemplary implementation, be communicated to the driver via the user interface 88. Additionally or alternatively, the driver can be requested to enter a desired torque threshold for launch and the vehicle control system 110 can confirm or indicate the requested threshold is not available as it is above the determined tractive effort threshold. This provides the vehicle operator the ability to tune the available tractive effort while having the vehicle control system predict/simulate that the same is within predetermined or determined threshold(s) based on vehicle components and road/ track surface conditions. Additionally, the operator can be presented with an option for a first or second gear launch depending on, for example, the determined tractive effort thresholds and the amount of engine 18 torque requested by the driver or ECU.

To enter the Release phase, which includes releasing the transbrake to accelerate the vehicle 14 from the standstill, the vehicle control system will verify that one or more of the criteria discussed with respect to entrance to the Engaged phase remain true. To release the transbrake, the operator will release the remaining applied or actuated paddle shifter 130. Upon the vehicle control system 110 receiving an indication of the same and the exit criteria (discussed immediately above) confirmed to remain true or acceptable, launch of the vehicle 14 will occur with release or venting of the fourth/additional clutch element.

More specifically, for the ABCE clutch application transbrake strategy, first gear launch will occur when additional clutch E is released, or second gear launch will occur when additional clutch C is released. For the ABCD clutch application transbrake strategy, first gear launch will occur when additional clutch D is released. And, for the ABDE clutch application transbrake strategy, second gear launch occurs when additional clutch D is released.

As discussed above, transbrake makes use of available vehicle components to react engine torque and provide significantly greater tractive effort torque for launch of the vehicle as compared to use of the vehicle's foundation brakes. Transbrake provides an OEM integrated approach with various safety and durability protecting features, as well as tunability options for the driver. Further, with respect to the transmission, transbrake does not require, in an exemplary implementation, any additional transmission hardware and utilizes a unique strategy discovered to temporarily lock the transmission and then release the same in a predetermined first or second gear launch powerflow configuration.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A vehicle transmission brake launch system, comprising:
   a transmission having a plurality of clutches and an output shaft, wherein actuation of different combinations of a predetermined number of clutches of the plurality of clutches provides powerflow for corresponding different transmission forward drive gears;
   a control system configured to:
      receive a command to initiate a performance launch of the vehicle;
      command the transmission to engage a combination of the predetermined number of clutches corresponding to a predetermined forward gear;
      command the transmission to engage an additional clutch of the plurality of clutches, thereby resulting in the transmission being in a state where the output shaft is bound and torque from an engine is prevented, by the transmission, from being transferred to drive wheels of the vehicle;
      command the engine to generate drive torque, the generated drive torque being greater than a predetermined torque capacity of a foundation brake system of the vehicle; and
      upon receipt of a command to launch the vehicle, command release of the additional clutch thereby unbinding the output shaft of the transmission and allowing powerflow in the predetermined forward gear such that the generated drive torque is transferred to the drive wheels to propel the vehicle.

2. The system of claim 1, wherein the control system is further configured to:
   confirm the foundation brakes are applied and vehicle brake torque is above a predetermined brake threshold;
   after commanding the transmission to engage the combination of the predetermined number of clutches corresponding to the predetermined forward gear and before commanding the transmission to engage the additional clutch, command the engine to generate a predetermined amount of torque that is less than the generated drive torque and less than the torque capacity of the foundation brake system; and
   transfer the predetermined amount of torque to the drive wheels through a driveline of the vehicle with the vehicle foundation brake system preventing movement of the drive wheels to thereby capture the predetermined amount of torque in the driveline to i) remove lash from the driveline, ii) preload bushings and one or more shafts of the driveline, and iii) torque an axle of the driveline against associated travel limiters.

3. The system of claim 2, wherein the control system is further configured to:
   maintain the brake torque above the predetermined brake threshold to keep driveline torque captured until the transmission is commanded to release the addition clutch, upon which an electronic stability control system of the vehicle is commanded to release the brake torque.

4. The system of claim 3, wherein the control system is further configured to:
   cause a message to be displayed via a user interface associated with an interior of the vehicle, the message instructing a brake pedal of the vehicle to be released; and
   maintain the brake torque above the predetermined brake threshold independent of application of the brake pedal so as to keep driveline torque captured until the transmission is commanded to release the addition clutch.

5. The system of claim 1, wherein the predetermined forward gear is first gear.

6. The system of claim 1, wherein the predetermined forward gear is one of first gear and second gear; and wherein the control system is further configured to determine whether the launch will be initiated with the transmission in first gear or second gear before commanding the transmission to engage the combination of the predetermined number of clutches corresponding to the predetermined forward gear.

7. The system of claim 1, wherein the plurality of clutches includes only five clutches, the transmission being free of any additional clutches utilized to make forward drive gears of the transmission.

8. The system of claim 7, wherein the combination of the predetermined number of clutches corresponding to the predetermined forward gear and the additional clutch are utilized in providing powerflow for first and second gears of the transmission.

9. The system of claim 7, wherein the combination of the predetermined number of clutches corresponding to the predetermined forward gear are utilized in providing powerflow for first gear of the transmission, and the additional clutch is utilized in providing powerflow for second gear and not for first gear.

10. The system of claim 7, wherein the combination of the predetermined number of clutches corresponding to the predetermined forward gear are utilized in providing powerflow for second gear of the transmission, and the additional clutch is utilized in providing powerflow for first gear and not for second gear.

11. The system of claim 1, wherein:
the predetermined forward gear is first gear;
the combination of the predetermined number of clutches corresponding to the predetermined forward gear includes two brake clutches and one rotating clutch; and
the additional clutch is a rotating clutch that, when utilized in the different combinations of the predetermined number of clutches of the plurality of clutches to provide powerflow for different forward drive gears of the transmission, provides powerflow for second through fourth and sixth gears of the transmission.

12. The system of claim 1, wherein:
the predetermined forward gear is second gear;
the combination of predetermined number of clutches corresponding to the predetermined forward gear includes two brake clutches and one rotating clutch; and
the additional clutch is a rotating clutch that, when utilized in the different combinations of the predetermined number of clutches of the plurality of clutches to provide powerflow for different forward drive gears of the transmission, provides powerflow for first, third and fifth through seventh gears of the transmission.

13. The system of claim 1, wherein the control system is further configured to determine a tractive effort threshold where greater torque applied to the wheels would result in wheel slip and, based on this determined tractive effort threshold, command the predetermined forward gear to be first gear or second gear.

14. The system of claim 1, wherein the predetermined number of clutches of the plurality of clutches is three clutches such that when the additional clutch is commanded to be engaged, four clutches are engaged.

* * * * *